United States Patent
Chou

(10) Patent No.: US 8,772,410 B1
(45) Date of Patent: Jul. 8, 2014

(54) POLYOLEFIN FOAMS FOR FOOTWEAR FOAM APPLICATIONS

(75) Inventor: Richard T. Chou, Hockessin, DE (US)

(73) Assignee: E I du Pont de Nemours and Company, Wilmington, DE (US)

(*) Notice: Subject to any disclaimer, the term of this patent is extended or adjusted under 35 U.S.C. 154(b) by 269 days.

(21) Appl. No.: 13/293,532

(22) Filed: Nov. 10, 2011

Related U.S. Application Data

(63) Continuation-in-part of application No. 11/157,893, filed on Jun. 21, 2005, now abandoned.

(60) Provisional application No. 60/581,493, filed on Jun. 21, 2004.

(51) Int. Cl.
  *C08L 33/02* (2006.01)
  *C08L 33/00* (2006.01)
  *C08J 9/00* (2006.01)
  *A43B 1/00* (2006.01)
  *A43B 1/10* (2006.01)

(52) U.S. Cl.
  USPC ............. 525/222; 525/191; 521/142; 521/82; 36/102

(58) Field of Classification Search
  USPC ............. 521/142, 82; 524/560; 525/191, 222; 36/102
  See application file for complete search history.

(56) References Cited

U.S. PATENT DOCUMENTS

| | | | |
|---|---|---|---|
| 4,480,054 A | 10/1984 | Enderle | |
| 4,663,362 A | 5/1987 | Koebisu et al. | |
| 5,373,027 A | 12/1994 | Hanley et al. | |
| 6,436,521 B1 | 8/2002 | Lee | |
| 6,528,550 B1 | 3/2003 | Hsu et al. | |
| 6,625,903 B2 | 9/2003 | Swango et al. | |
| 6,667,358 B1 * | 12/2003 | Aoyama | 524/436 |
| 6,797,737 B1 * | 9/2004 | Hsu et al. | 521/134 |
| 7,208,541 B2 | 4/2007 | Gong et al. | |

FOREIGN PATENT DOCUMENTS

| | | |
|---|---|---|
| WO | 9858993 | 12/1998 |
| WO | 0015696 | 3/2000 |
| WO | 0102473 | 1/2001 |

OTHER PUBLICATIONS

Richard T. Chou and Wayne C. Whelchel, "New enhanced ethylene acrylate copolymers for crosslinked foam applications", Annual Technical Conference—Society of Plastics Engineers, (2002), 1802-1806, 60th(vol. 2), Coden: ACPED4 ISSN:0272-5223. AN 2002:572803 CAPLUS.

Hawley's Condensed Chemical Dictionary, 2002, John Wiley & Sons, Inc., Fourteenth Edition.

PCT Invitation to Pay Additional Fees with Communication Relating to the Results of the Partial International Search for International Application No. PCT/US2005/022114 dated Sep. 21, 2005.

"Dow Plastics" http://plastics.dow.com/ap/prod/performance/affinity.htm> Accessed Jun. 20, 2007.

\* cited by examiner

*Primary Examiner* — Kara Boyle

(57) ABSTRACT

A composition that can be used as foam composition is disclosed, which comprises or is produced from an ethylene acrylate dipolymer, an acid copolymer, and optionally a soft ethylene polymer. The ethylene acrylate dipolymer comprises repeat units derived from ethylene and at least one alkylacrylate. The acid copolymer comprises repeat units derived from ethylene and acrylic acid, methacrylic acid, or combinations thereof. The soft ethylene polymer comprises ethylene and an $\alpha$-olefin, vinyl acetate, or combinations thereof.

19 Claims, No Drawings

POLYOLEFIN FOAMS FOR FOOTWEAR FOAM APPLICATIONS

This application is a continuation-in-part of application Ser. No. 11/157,893 filed Jun. 21, 2005 (now pending); which claims priority to U.S. provisional application Ser. No. 60/581,493, filed Jun. 21, 2004, the entire disclosure of which is incorporated herein by reference.

The invention relates to a polymer foam composition such as a crosslinked polymer foam composition and an article produced therefrom.

BACKGROUND OF THE INVENTION

Polyolefinic materials encompass a variety of polymers ranging from semi-rigid polypropylene (PP) to soft ethylene polymers. They can be used to produce a variety of foam products. Most polyolefin foams are closed-cell foams, which are buoyant, resilient, tough, flexible, and resistant to chemicals and abrasion. Therefore, polyolefin foams are useful for packaging, construction, insulation, sports, leisure and footwear applications.

Copolymers of ethylene and vinyl acetate (EVA) have been widely used as base resin polymers in foam applications for many years. Crosslinked EVA foams, expanded with chemical blowing agents, provide an attractive balance of resilience, durability and other physical properties required for soling applications in footwear. These properties are provided at low density, which is desirable for lighter weight shoes, and at an attractive cost. EVA may present limitations in attaining a balance of softness (e.g., surface softness), low compression set, and high resilience. Also, as foam processes move more toward one-step injection molding, achieving balanced properties using EVA foam may become difficult.

Foams made from ethylene acrylate copolymers (also referred to as ethylene-acrylic acid ester copolymers), such as ethylene-methyl acrylate copolymer (E/MA) with high MA content, are generally soft, have low density and are highly resilient.

E/MA foam may be weak in mechanical properties, such as tear strength and tensile strength, and may be difficult to crosslink.

There is a continued need to develop new products to expand the performance window of known polyolefin foams, such as the foam footwear market, to reduce costs, and to improve manufacturing process. It is also desirable to improve the crosslinking and mechanical properties while retaining the inherent merits of E/MA foams.

SUMMARY OF THE INVENTION

The invention provides a foamable or foam composition comprising (a) an ethylene acrylate copolymer, (b) an acid copolymer, and, optionally, (c) a soft ethylene polymer.

The invention also provides a crosslinked polymer foam composition comprising: (a) about 50 to about 95 wt %, or about 70 to about 90 wt %, or about 60 to about 80 wt %, ethylene acrylate dipolymer, (b) about 5 to about 50 wt % or about 10 to about 30 wt % acid copolymer, and optionally (c) about 0 or about 5 to about 40 wt % soft ethylene polymer wherein all weight percentages are based on the combined weight of (a)+(b)+(c).

The invention further provides a foam article made from the compositions disclosed herein as well as a midsole or insole for footwear.

DETAILED DESCRIPTION OF THE INVENTION

"Copolymer" means a polymer comprising repeat units derived from two or more monomers or comonomers and thus including terpolymer or tetrapolymer.

Ethylene acrylate copolymer can comprise repeat units derived from ethylene and an ester of unsaturated carboxylic acid such as (meth)acrylate or $C_1$ to $C_8$ alkyl acrylate, or combinations of two or more thereof "(Meth)acrylate", refers to acrylate, alkyl acrylate, methacrylate, or combinations of two or more thereof. An ethylene acrylate copolymer is preferably a dipolymer of ethylene and a comonomer selected from the group consisting of methacrylate, acrylate, $C_1$ to $C_8$ alkyl acrylate, or combinations of two or more thereof. Furthermore, the ethylene dipolymer does not contain a comonomer derived from acid, $CO_2$, or $SO_2$.

Examples of alkyl acrylates include methyl acrylate, ethyl acrylate and butyl acrylate. For example, "ethylene/methyl acrylate (E/MA)" means a dipolymer of ethylene and methyl acrylate (MA); "ethylene/ethyl acrylate (E/EA)" means a dipolymer of ethylene and ethyl acrylate (EA); "ethylene/butyl acrylate (E/BA)" means a dipolymer of ethylene and butyl acrylate (BA); and includes both n-butyl acrylate and iso-butyl acrylate; and combinations of two or more thereof.

Copolymers of ethylene and an acrylate are well known. "Ethylene acrylate copolymers" may also be referred to as ethylene-acrylic acid ester copolymers. They can be manufactured from two high-pressure free radical processes: tubular processes or autoclave processes. The difference in ethylene acrylate copolymers made from the two processes is described in, e.g., "High flexibility E/MA made from high pressure tubular process." Annual Technical Conference—Society of Plastics Engineers (2002), 60th (Vol. 2), 1832-1836. The ethylene acrylate copolymer produced from the tubular process is preferred in the invention herein.

Alkyl acrylate comonomer incorporated into ethylene acrylate dipolymer can vary from 0.01 or 5 up to as high as 40 weight % of the total dipolymer or even higher such as from 5 to 30, or 10 to 25, wt %.

The ethylene acrylate copolymer is substantially, essentially, or completely, free of a third comonomer such as carbon monoxide, glycidyl acrylate, glycidyl methacrylate, and glycidyl vinyl ether, or combinations of two or more thereof.

The ethylene acrylate dipolymer may contain about 15 to about 40, or about 18 to about 35, wt % of acrylate comonomer. Increasing acrylate comonomer may improve the elastomeric properties and increase the tackiness of the dipolymer. The ethylene acrylate dipolymer may have a melt index (MI) of from about 0.1 to about 100, or about 0.5 to about 20, g/10 min, measured with ASTM D-1238, condition E (190° C., 2160 gram weight).

An acid copolymer can comprise repeat units derived from ethylene and an unsaturated carboxylic acid such as (meth)acrylic acid, maleic acid, fumaric acid, maleic anhydride, fumaric anhydride, maleic acid monoester, fumaric acid monoester, or combinations of two or more thereof "(Meth) acrylic", refers to acrylic acid, methacrylic acid, or combinations thereof. For example, "ethylene/methacrylic acid (E/MAA)" means a dipolymer of ethylene (E) and methacrylic acid (MAA); "ethylene/acrylic acid (E/AA)" means a dipolymer of ethylene and acrylic acid (E/AA). Examples of more than one comonomer are also included. For example, "ethylene/isobutyl acrylate methacrylic acid (E/iBA/MAA)" means a terpolymer of ethylene (E), iso-butyl acrylate (iBA) and methacrylic acid (MAA). The acid dipolymer can comprise about 1 to about 10 mole % of repeat units derived from an acid or anhydride or monoester of a diacid.

Preferably an ethylene acid copolymer is a dipolymer that does not contain a repeat unit derived from methacrylate or acrylate.

(Meth)acrylic acid comonomer incorporated into ethylene acid copolymer can vary from 0.01 or 5 up to as high as 30 wt % of the total dipolymer or even higher such as from 5 to 25, or 10 to 25, wt %. The acid copolymer may also contain up to 25 wt % of an alkyl acrylate having an alkyl group with a $C_1$-$C_8$ alkyl acrylate.

Ethylene acid copolymers and their methods of preparation are well known in the art such as disclosed in U.S. Pat. Nos. 3,264,272, 3,404,134, 3,355,319 and 4,321,337. Commercial acid dipolymers suitable for use in the invention herein are available from various sources, including the E.I. du Pont de Nemours and Company, Wilmington, Del. (DuPont) under the trademark NUCREL®.

Ethylene acid dipolymers may be direct dipolymers or graft dipolymers. 'Direct dipolymer' is a dipolymer made by polymerization of monomers together, at the same time, as distinct from a graft dipolymer where a monomer is polymerized on an existing polymer chain.

The acid copolymer is preferably present in an amount ranging from about 5% to about 50% by weight, more preferably from about 10% to about 30% by weight, and most preferably about 8% to about 15% by weight. The acid dipolymer preferably contains about 4 to about 25 weight percent of acid, and more preferably about 8 to about 15 weight percent of acid. The acid dipolymer may have a melt index of from 0.1 to 500, preferably 1 to 100, most preferably 1 to 30 grams/10 minutes.

The acid copolymer may have a melt index of from about 0.1 to 100, or about 0.5 to 20 g/10 minutes, be derived from an acid dipolymer having about 4 to about 25, or about 8 to about 15, wt % of acid, and have a degree of neutralization ranging from about 20 to 70 wt %.

Soft ethylene polymer is a dipolymer of ethylene and an α-olefin dipolymer, dipolymer of ethylene and vinyl acetate, or combinations thereof. Soft ethylene polymer can be made by any processes well known in the art, including the use of Ziegler Natta catalysts, metallocene catalysts, and other catalysts useful in "low pressure" polymerization processes. EVA dipolymers may be made in "high pressure" polymerization processes using, for example, free radical initiators. Because these processes are well known, the disclosure of which is omitted for the interest of brevity.

A soft ethylene polymer includes linear low-density polyethylene (LLDPE), metallocene-catalyzed polyethylene (MPE), EVA dipolymer, or combinations of two or more thereof. MPE can have a density less than about 0.89 and a melt index (MI) of from about 0.1 to 100, or about 0.5 to 30, g/10 minutes, as measured using ASTM D-1238, condition E (190° C., 2160 gram weight). EVA may comprise repeat units derived from at least about 15 wt %, or about 15 to about 35 wt %, or about 18 to about 30 wt %, vinyl acetate. The ethylene soft polymer may have a melt index (MI) of from about 0.1 to 100, or about 0.5 to about 20 (for EVA, about 0.5 to 30), g/10 minutes, as measured using ASTM D-1238, condition E (190° C., 2160 gram weight). EVA is available from DuPont.

MPE is also referred to as metallocene polyethylene dipolymer, dipolymer of ethylene and an α-olefin monomer using a metallocene catalyst. MPE technology is capable of making lower density MPE with high flexibility and low crystallinity. MPE technology is described in, for example, U.S. Pat. Nos. 5,272,236, 5,278,272, 5,507,475, 5,264,405, and 5,240,894. MPE dipolymers include Dow Chemical Co under AFFINITY®, DuPont-Dow under the ENGAGE®, and Exxon Mobile under the EXACT® and PLASTOMER®.

The composition can also be a crosslinked foam composition including desired properties such as high resiliency, lower compression set, and most importantly foam softness. For example, foams derived from ethylene-methyl acrylate dipolymer (E/MA) with high MA content may be generally soft, have low density, and are highly resilient. These properties are desirable in foam footwear applications, specifically for midsoles and insoles. The mechanical properties of E/MA foams, such as split tear resistance and tensile strength, may not be as desirable for maintaining long durability. As the foam density decreases, the mechanical properties of E/MA may deteriorate. Blending E/MA with an ethylene acid dipolymer may enhance E/MA mechanical properties thereby making the E/MA foam useful for midsole foam applications.

The foam composition can comprise about 95 to about 40 wt %, about 90 to about 50 wt %, or about 80 to about 60 wt % of an ethylene acrylate dipolymer such as ethylene-methyl acrylate, ethylene-butyl acrylate, or ethylene-ethyl acrylate.

The soft ethylene polymer can be present in a range from about 0 to about 40%, or about 5% to about 30%, or about 10% to 30%, by weight.

The composition may additionally comprise other polymers, different from those disclosed above in an amount ranging from about 0.01 to about 15 or 0.5 wt % to about 10 wt % of the composition including LDPE, LLDPE, or combinations thereof.

The composition may also comprise a free radical initiator or crosslinking agent including organic peroxides such as dialkyl organic peroxides ranging from about 0.2 to about 1.5% (i.e., about 0.2 to about 1.5 parts by weight of peroxide for each 100 parts by weight of the composition). Examples of organic peroxides include 1,1-di-t-butyl peroxy-3,3,5-trimethylcyclohexane, t-butyl-cumyl peroxide, dicumyl-peroxide, 2,5-dimethyl-2,5-di(tertiary-butyl-peroxyl)hexane, 1,3-bis(tertiary-butyl-peroxyl-isopropyl)benzene, or combinations of two or more thereof.

The composition may also comprise about 0.001 to about 1 wt % of a co-curing agent including trimethyl propane triacrylate (and similar compounds), N,N-m-phenylenedimaleimide, triallyl cyanurate, or combinations of two or more thereof.

The foam composition can also comprise, about 0.001 or about 0.2 to about 10% by weight of the composition, a blowing agent. A blowing agent can be a chemical blowing agent or a physical blowing agent. Physical blowing agents are halocarbons, volatile organic compounds, or non-flammable inert atmosphere gases. Chemical blowing agents include azodicarbonamide (ADCA), dinitroso-pentamethylene-tetramine (DPT), P-toluene sulfonyl hydrazide, and p.p'-oxybis(benzenesulfonyl hydrazide). To tailor expansion-decomposition temperature and foaming processes, a blowing agent may also be a mixture of blowing agents or of blowing agents with a blowing aid. For example, Vinyl for AK-2 (manufactured by Eiwa Kasei Chemical Co., Japan) is a mixture of ADCA and DPT. Uniroyal Chemical Celogen 765 is a modified ADCA.

The composition may also include about 1 to about 10% or about 2 to 6% by weight (of the composition) an activator (for the blowing agent) to lower the decomposition temperature/profile of blowing agents. A blowing agent activator can be one or more metal oxides, metal salts, or organometallic complexes. Examples include ZnO, Zn stearate, MgO, or combinations of two or more thereof.

Other additives may include any additives typically used in similar crosslinked polymer compositions and may include a pigment ($TiO_2$ and other compatible colored pigments), an adhesion promoter (to improve adhesion of the expanded foam to other materials), a filler (e.g., calcium carbonate, barium sulfate, and/or silicon oxide), a nucleating agent (pure form or concentrate form, e.g., $CaCO_3$ and/or $SiO_2$), rubber (to improve rubber-like elasticity, such as natural rubber, SBR, polybutadiene, and/or ethylene propylene terpolymer), a stabilizer (e.g., antioxidants, UV absorbers, and/or flame retardants), and a processing aid (e.g., Octene R-130 manufactured by Octene Co., Taiwan).

The foam composition may be produced by a number of methods, such as compression molding, injection molding and hybrids of extrusion and molding. The process can comprise mixing the polymers and crosslinking agents under heat to form a melt, along with blowing agents and other typical additives, to achieve a homogeneous compound. The ingredients may be mixed and blended by any means known in the art such as with a Banbury, intensive mixers, two-roll mill, and extruder. Time, temperature, shear rate may be regulated to ensure optimum dispersion without premature crosslinking or foaming. A high temperature of mixing may result in premature crosslinking and foaming by decomposition of peroxides and blowing agents. An adequate temperature may be necessary to insure good mixing of the polymers, e.g., E/MA and E/MAA (and/or MPE), and the dispersion of other ingredients. E/MA and E/MAA can form a uniform blend when blended at temperatures of about 80 to about 150° C. or about 80° C.-130° C. The upper temperature limit for safe operation may depend on the onset decomposition temperatures of peroxides and blowing agents employed.

Optionally, polymers such as E/MA and E/MAA can be melt-blended in an extruder at a temperature up to about 250° C. to allow potentially good mixing. The resultant mixture can be then compounded with the ingredients disclosed above.

After mixing, shaping can be carried out. Sheeting rolls or calendar rolls are often used to make appropriately dimensioned sheets for foaming. An extruder may used to shape the composition into pellets.

Foaming can be carried out in a compression mold at a temperature and time to complete the decomposition of peroxides and blowing agents. Pressures, molding temperature, and heating time may be controlled. Foaming can be carried out in an injection molding equipment by using foam composition in pellet form. The resulting foam can be further shaped to the dimension of finished products by any means known in the art such as by thermoforming and compression molding.

The resulting polymer foam composition can be substantially closed cell and useful for a variety of articles, e.g., footwear application including midsoles or insoles.

The resulting foam can have a density of lower than about 2 or 0.16 g/cc; foam hardness of about 25 to about 55 Asker C; split tear strength of at least 2.5 or 3 kg/cm; compression strength of at least 28, 30, or 35 pounds/$in^2$.

The invention can be illustrated by the following examples, which are not meant to limit the scope of the invention.

EXAMPLES

Test Methods

Foam rebound resilience test was measured according to ASTM D3574. The hardness of the foam was measured on a Type C (spring-type) hardness tester of ASKER, Japan according to ASTM D2240. Compression set was measured according to ASTM D3754 at the conditions of 50° C./6 hours. Split-tear was measured according to ASTM D3574. Compression strength testing was performed on an Instron Universal testing machine fitted with a compression cage deforming the foam samples at a uniform rate of 0.05 in./min. The stress required to produce compression strain up to 50% was determined. The compressive stress was determined as the force per unit area based on the original foam cross-section.

Sample Preparation:

Polymers and chemicals were weighed on a Mettler PC 2000 balance followed by mixing. E/MA and E/MAA were charged into a Banbury (Bolling internal mixer). The mixer had a capacity of 1100 cc. The resins were fluxed at a temperature from 150° F.-200° F. After 1-2 minutes the remaining ingredients (except peroxide and blowing agent) were incorporated for 4-5 minutes. Then peroxide, blowing agents and other ingredients were added next. The mixing continued for 4-5 additional minutes, keeping the temperature under 200° F. The compound was discharged and transferred to a 6 inch× 13 inch Bolling OX two-roll mill. The mill was oil heated and set for a temperature of 150° F. Batch size for the mill was about 500 to 1200 g. Maximum speed was 35 feet per minute. Roll gap was adjusted to produce sheets for sample cutting (150 to 300 mils).

Samples were cut on a Hudson Hydraulic Clicker, using a 3 inch×3 inch die, and weighed to 90 g. The foaming process consisted of putting the 90 g sample into a 3 inch×3 inch beveled mold with an overall measurement of 6×6×½ inches. This was put between two 9 inch by 10 inch by ¼ inch aluminum plates. The plates and sample were placed into an automatic PHI press. Samples were typically in the press for 10-30 minutes at a temperature of about 155° C.-185° C. under pressure of about 3300 lbs. The foam was formed instantaneously when the mold was opened at the end of the molding cycle.

Results shown in the following table show that foams of ethylene-methyl acrylate dipolymers (Comparable Examples A, B and C) exhibited softness that provided comfort in wearing and excellent resilience, but exhibited lower mechanical properties. All Comparative Examples showed low split-tear strength and compression strength. Compression strength determined the load bearing capability of foam at a given density.

Comparative Example B and Comparative Example C containing higher peroxide content, while Comparative Example C also containing co-curing agent, showed improved compression set, but further deteriorated split-tear As seen in the Table below, the E/MA foams modified with a minor component of acid copolymer showed higher tear strength and compression strength. Example 3, containing a soft E/nBA/MAA terpolymer, also rendered an enhancement in tear strength. All foams retained softness, which was an attractive feature for E/MA foams. Example 4, containing both acid copolymer and MPE, appeared to achieve balanced properties by attaining high resilience, desirable softness and mechanical strength. All Examples show desired balance of properties for footwear applications.

| Example[1] | Foaming Condition (C/min) | Foam Density (g/cc) | Foam Hardness (Asker C) | Compression Set (%) | Split Tear Strength (kg/cm) | Compression Strength (PSI) | Rebound Resilience (%) |
|---|---|---|---|---|---|---|---|
| Comp Ex A | 165/20 | 0.122 | 30 | 59 | 2.4 | 22 | |
|  | 175/10 | 0.118 | 29 | 59 | 2.6 | | 54 |
| Comp Ex B | 165/20 | 0.156 | 34 | 48 | 1.9 | 34.5 | 51 |
|  | 175/10 | 0.132 | | 52 | 1.8 | | 54 |
| Comp Ex C | 165/20 | 0.28 | 47 | 39 | 1.6 | | |
|  | 175/10 | 0.166 | 42 | 42 | 1.4 | | |
| Ex 1 | 165/20 | 0.14 | 38 | 51 | 3.6 | 35 | 44 |
|  | 175/10 | 0.126 | | 57 | 2.3 | | 46 |
| Ex 2 | 165/20 | 0.146 | 40 | 50 | 3.2 | 39.4 | 40 |
|  | 175/10 | 0.133 | | 54 | 3.1 | | 44 |
| Ex 3 | 165/20 | 0.139 | 27 | 55 | 3.2 | 28.3 | 47 |
|  | 175/10 | 0.126 | | 62 | 3 | | 48 |
| Ex 4 | 155/20 | 0.155 | 48 | 51 | 3.7 | 43.7 | 48 |
|  | 165/20 | 0.156 | 50 | 52 | 3 | | 50 |

[1]Peroxide present was Comparative Example A (0.8 pph, parts per 100 parts of the composition) and all other Comparative Examples and Examples were each 1 pph.

COMPOSITION OF THE EXAMPLES

All examples used E/MA (ethylene/methyl acrylate dipolymer containing 24 wt % MA with a MI of 2.0, DuPont) and Celogen 765 (from Uniroyal Co.) as blowing agent.

Comparative Example A

E/MA, 832 g; DCP, 6.7 g; blowing agent, 30 g; Zn stearate, 8.0 g; ZnO, 8.0 g; Stearic acid, 4.0 g; CaCO₃, 25 g.

Comparative Example B

E/MA, 832 g; DCP, 8.5 g; blowing agent, 30 g, Zn stearate, 4.0 g; CaCO3, 25 g

Comparative Example C

E/MA, 832 g; DCP, 8.5 g; triallyl cyanuate, 4.5 g; blowing agent, 25 g; Zn stearate, 4.0 g; Stearic acid, 4.0 g; CaCO₃, 25 g.

Example 1

E/MA, 707.3 g; E/MAA (ethylene/methacrylic acid copolymer containing 9 wt % of methacrylic acid with a MI of 3.0, DuPont), 124.3 g; DCP, 8.5 g, blowing agent, 30 g; Zn stearate, 4.0 g; CaCO3, 25 g.

Example 2

E/MA, 707.3 g, E/MAA (same as Example 1), 124.3 g, DCP, 8.5 g, TAC (triallyl cyanuate), 4.5 G; blowing agent, 30 g, Zn stearate, 4.0 g, CaCO3, 25 g.

Example 3

E/MA, 707.3 g, E/nBA/MAA (terpolymer of ethylene, n-butyl acrylate and methacrylic acid containing 23 wt % of n-butyl acrylate and 9 wt % of methacrylic acid with a MI of 30, DuPont), 124.3 g; DCP, 8.5 g; blowing agent, 30 g, Zn stearate, 4.0 g, CaCO3, 25 g.

Example 4

E/MA, 442 g, MPE (a dipolymer of ethylene and 1-octene with a density of 0.87 g/cc and a MI of 1.0, from DuPont Dow Elastomers), 265 g, E/MAA (same as Example 1), 124.3 g, DCP, 8.5 g; blowing agent, 30 g, Zn stearate, 6 g, Stearic acid, 9.6 g.

The invention claimed is:

1. An article comprising, or produced from, an ethylene acrylate dipolymer, an acid copolymer, and optionally a copolymer of ethylene and an α-olefin wherein
   the article is a footwear foam having a density lower than 2 g/cc, a foam hardness of about 25 to about 55 Asker C; a split tear strength of at least 2.5 kg/cm; and a compression strength of at least 28 pounds/in²;
   the ethylene acrylate dipolymer is derived from ethylene and a comonomer selected from the group consisting of methacrylate, acrylate, $C_1$ to $C_8$ alkyl acrylate, and combinations of two or more thereof; and the ethylene acrylate dipolymer is substantially free of a third comonomer; and
   the acid copolymer comprises repeat units derived from ethylene and an acid monomer selected from the group consisting of (meth)acrylic acid, maleic acid, fumaric acid, maleic anhydride, fumaric anhydride, maleic acid monoester, fumaric acid monoester, and combinations of two or more thereof.

2. The article of claim 1 wherein the comonomer is selected from the group consisting of methyl acrylate, ethyl acrylate, and butyl acrylate and the acid copolymer is present in the article from about 10 to about 30 weight %.

3. The article of claim 1 wherein the acid copolymer is ethylene n-butyl acrylate (meth)acrylic acid terpolymer is present in the article from about 8 to about 15 weight %.

4. The article of claim 2 wherein the acid copolymer is a dipolymer of ethylene and (meth)acrylic acid.

5. The article of claim 2 wherein the composition comprises the copolymer of ethylene and an α-olefin, which is a dipolymer of ethylene and α-olefin.

6. The article of claim 5 wherein the α-olefin is 1-octene.

7. The article of claim 6 further comprising, based on the weight of the article, about 0.2 to about 1.5 wt % of a crosslinking agent.

8. The article of claim 7 further comprising about 0.5 to about 10 wt % of a blowing agent.

9. The article of claim 8 further comprising about 0.1 to about 10 wt % of an activator for the blowing agent and optionally 0.1 to 1 wt % of a co-curing agent including trimethyl propane triacrylate (and similar compounds), N,N-m-phenylenedimaleimide, triallyl cyanuate, or combinations of two or more thereof.

10. The article of claim 8 wherein the acid copolymer is a dipolymer that does not contain a repeat unit derived from methacrylate or acrylate.

11. The article of claim 2 wherein the copolymer of ethylene and an α-olefin is a metallocene-catalyzed polyethylene.

12. A foam composition comprising or produced from, based on the weight of the composition, about 50 to about 95 wt % of an ethylene alkyl acrylate dipolymer or ethylene methacrylate dipolymer, about 10 to about 30 wt % of an ethylene acrylic acid dipolymer or ethylene methacrylic acid dipolymer, and an ethylene α-olefin dipolymer wherein the foam composition has a density lower than 2 g/cc, a foam hardness of about 25 to about 55 Asker C; a split tear strength of at least 2.5 kg/cm; and a compression strength of at least 28 pounds/in$^2$.

13. The composition of claim 12 wherein the ethylene α-olefin dipolymer is an ethylene 1-octene dipolymer.

14. The composition of claim 13 further comprising about 0.2 to about 1.5 wt % of a crosslinking agent, about 0.5 to about 10 wt % of a blowing agent(s), about 0.1 to about 10 wt % of an activator for the blowing agent, and optionally 0.1 to 1 wt % of a co-curing agent.

15. An article comprises or produced from a composition wherein the article includes foam, a midsole for footwear, insole for footwear, or combinations of two or more thereof and the composition is as recited in claim 12.

16. The article of claim 15 wherein the composition ethylene α-olefin dipolymer is an ethylene 1-octene dipolymer.

17. The article of claim 16 wherein the article is a midsole for footwear, an insole for footwear, or both.

18. The article of claim 11 wherein the footwear is a midsole.

19. The article of claim 11 wherein the footwear is an insole.

* * * * *